(12) United States Patent
Neet

(10) Patent No.: US 7,788,790 B2
(45) Date of Patent: Sep. 7, 2010

(54) METHOD FOR FORMING A STATOR CORE

(75) Inventor: Kirk E. Neet, Pendleton, IN (US)

(73) Assignee: Remy Technologies, L.L.C., Anderson, IN (US)

( * ) Notice: Subject to any disclaimer, the term of this patent is extended or adjusted under 35 U.S.C. 154(b) by 1139 days.

(21) Appl. No.: 11/390,485

(22) Filed: Mar. 27, 2006

(65) Prior Publication Data

US 2007/0222323 A1 Sep. 27, 2007

(51) Int. Cl.
*H02K 15/00* (2006.01)

(52) U.S. Cl. .............................. 29/596; 29/597; 29/598; 29/732; 310/184

(58) Field of Classification Search ........... 29/596–598, 29/732, 605–606; 310/154–156, 215, 71, 310/179–184, 201–205
See application file for complete search history.

(56) References Cited

U.S. PATENT DOCUMENTS

| | | | |
|---|---|---|---|
| 5,060,364 A * | 10/1991 | Scherer ........................ | 29/734 |
| 6,557,239 B2 * | 5/2003 | Takahashi et al. ............. | 29/596 |
| 6,750,582 B1 * | 6/2004 | Neet ........................... | 310/208 |
| 6,873,082 B2 * | 3/2005 | Neet ........................... | 310/215 |
| 6,938,323 B2 * | 9/2005 | Katou et al. .................. | 29/596 |
| 7,194,794 B2 * | 3/2007 | Arendes et al. ............... | 29/596 |
| 7,367,106 B2 * | 5/2008 | Becherucci et al. ........... | 29/596 |
| 7,386,931 B2 * | 6/2008 | Neet et al. .................... | 29/596 |
| 2004/0263016 A1 | 12/2004 | Neet | |
| 2005/0280327 A1 | 12/2005 | Neet | |

OTHER PUBLICATIONS

International Search Report with Written Opinion, Application No. PCT/US2007/006208; Mailed Nov. 27, 2007.
European Search Report, Application No. PCT/US2007/006208; Mailed Jul. 7, 2007.

* cited by examiner

*Primary Examiner*—Minh Trinh
(74) *Attorney, Agent, or Firm*—Cantor Colburn LLP

(57) ABSTRACT

A stator of a rotary electric machine having secured core slot insulators includes a multi-phase stator winding, having a plurality of slot segments that are adapted to be radially inserted into a plurality of circumferentially spaced axially-extending core slots in a surface of a cylindrically-shaped stator core. The stator winding includes the plurality of slot segments alternately connected at the first and second ends of the stator core by a plurality of end loop segments to form the winding. The plurality of core slots house an insulator to electrically isolate the slot segments from the core slots. The insulator is secured to the sides of the core slot prior to the process of radial inserting the plurality of slot segments into the plurality of core slots of the cylindrically-shaped stator core.

7 Claims, 9 Drawing Sheets

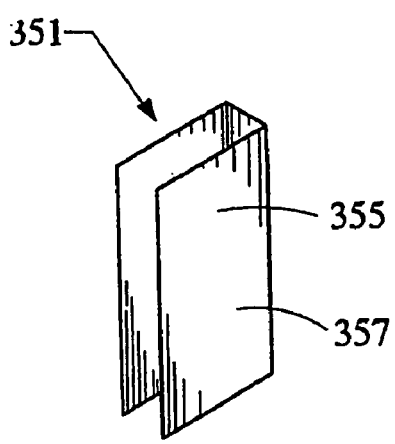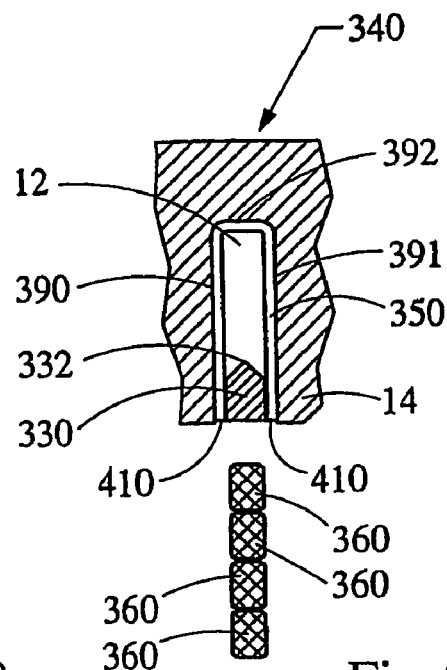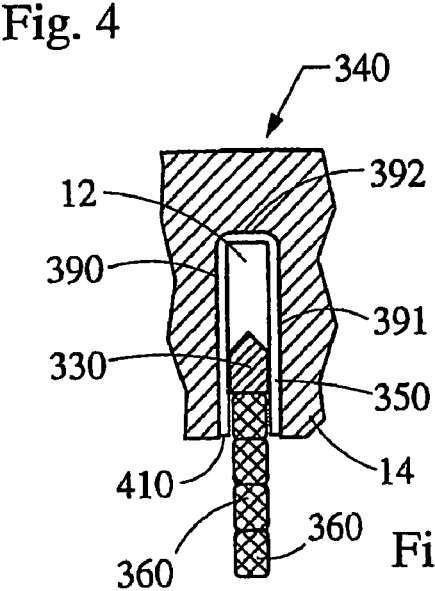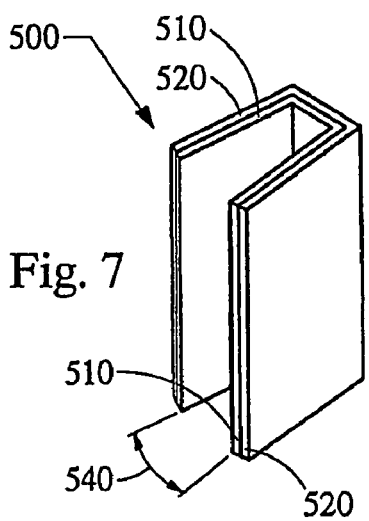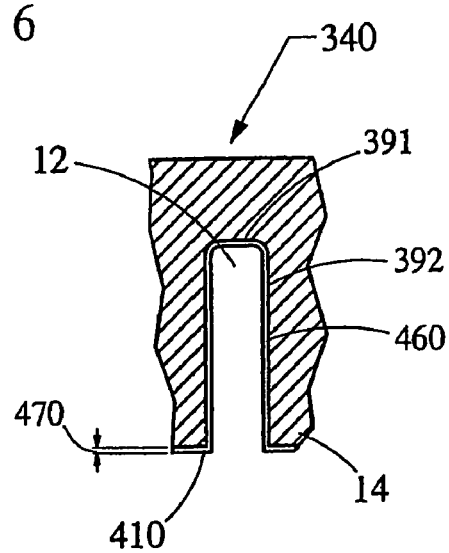

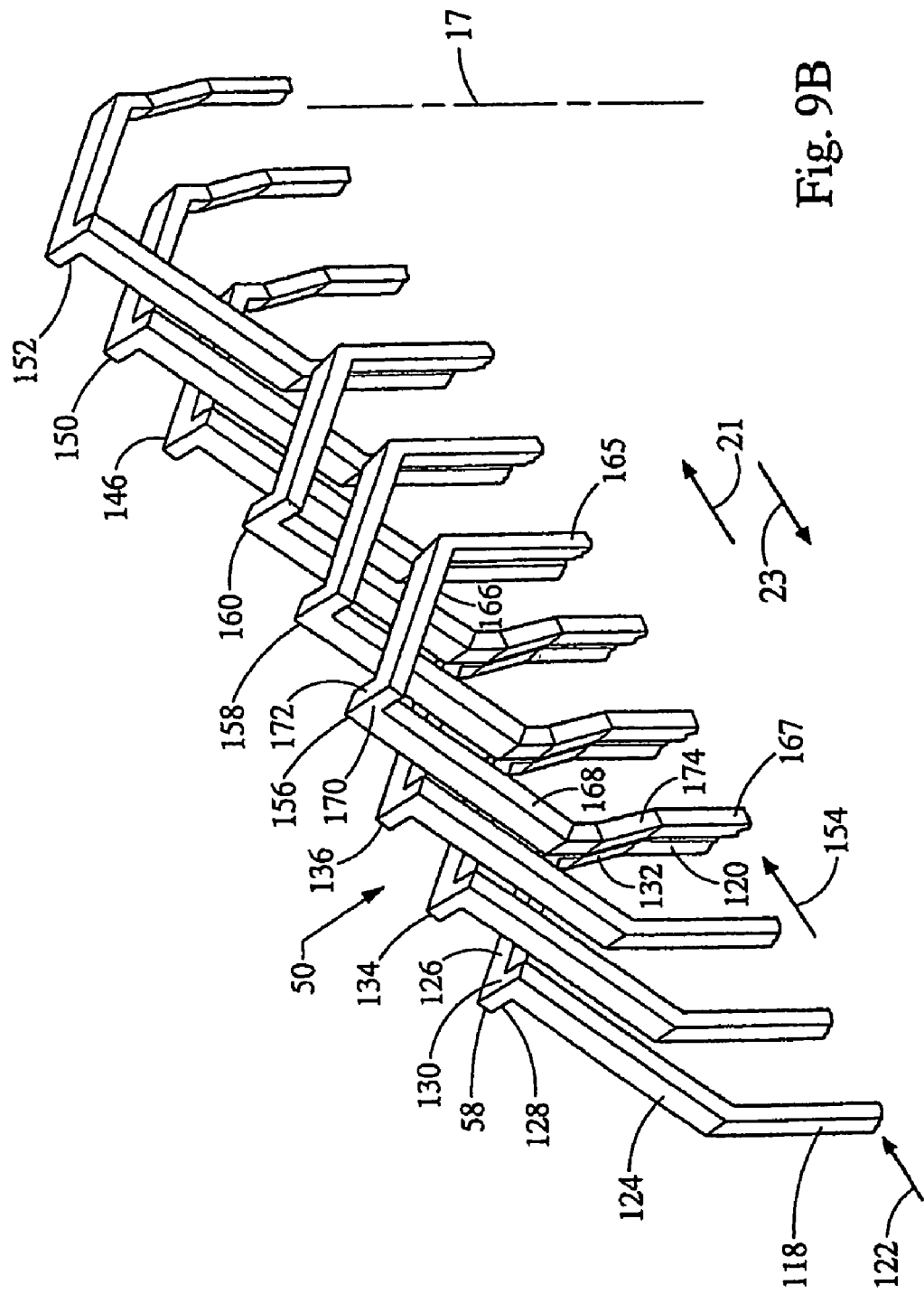

METHOD FOR FORMING A STATOR CORE

BACKGROUND OF THE INVENTION

The present invention relates generally to electric machines and, in particular, to a core slot insulator for an electric machine having a core and a winding. Electric machines, such as alternating current electric generators, or alternators are well known. Prior art alternators typically include a stator assembly and a rotor assembly disposed in a alternator housing. The stator assembly is mounted to the housing and includes a generally cylindrically-shaped stator core having a plurality of slots formed therein. The rotor assembly includes a motor rotor attached to a generally cylindrical shaft that is rotatably mounted in the housing and is coaxial with the stator assembly. The stator assembly includes a plurality of wires wound thereon, forming windings. The stator windings are formed of slot segments that are located in the core slots and end loop segments that connect two adjacent slot segments of each phase and are formed in a predetermined multi-phase (e.g. three or six) winding pattern in the slots of the stator core. The slot segments are typically insulated from the core by a sheet type insulator or a coating. The term sheet type insulator, utilized herein, is used to describe an insulator that is formed from a flat member, which is folded to form the U-shaped insulator. A typical sheet type insulator well known to those skilled in the art is a film/nomex laminate and they are commonly known as "slot liners" to those skilled in the art. The rotor assembly can be any type of rotor assembly, such as a "claw-pole" rotor assembly, which typically includes opposed poles as part of claw fingers that are positioned around an electrically charged rotor coil. The rotor coil produces a magnetic field in the claw fingers. As a prime mover, such as a steam turbine, a gas turbine, or a drive belt from an automotive internal combustion engine, rotates the rotor assembly, the magnetic field of the rotor assembly passes through the stator windings, inducing an alternating electrical current in the stator windings in a well known manner. The alternating electrical current is then routed from the alternator to a distribution system for consumption by electrical devices or, in the case of an automotive alternator, to a rectifier and then to a charging system for an automobile battery.

One type of device is a high slot fill stator, which is characterized by rectangular shaped conductors whose width, including any insulation fit, closely to the width, including any insulation of the rectangular shaped core slots. High slot fill stators are advantageous because they are efficient and help produce more electrical power per winding than other types of prior art stators. A disadvantage of the high slot fill stators is the difficulty of inserting the wires whose width fits closely to the width of the slots. The potential of the windings to catch the edge of the slot liner as the windings are inserted, thereby damaging the slot liner and causing an electrical ground from the winding to the core is rather large. To compound this problem, the slot liners of a high slot fill stator are typically very thin in thickness to allow for a greater slot fill numbers. A thin material has less column strength and therefore is more likely to intrude into the slot and be caught by the conductors as they are inserted. One commonly known method employed to counteract this potential failure is to create the winding from U shaped conductors that are axially inserted into the core slots. This may solve the slot liner issue but it disadvantageously creates a difficult process of welding the U shaped segments together to form the winding. Another method employed to solve the slot liner issue is to insert the windings into a flat lamination stack and roll the lamination stack and winding assembly into the desired cylindrically-shaped shape. The flat stack inherently has a wider slot opening, which eases the step of successfully inserting conductors into the slots beyond the slot liners, but it also disadvantageously introduces a process of rolling the core/winding assembly and welding the core ends.

It is desirable, therefore, to provide a stator assembly that meets the requirements of a high slot fill stator including conductors having slot segments with a width, including any insulation, that closely fits to the width, including any insulation, of the core slot, and being radially inserted into a cylindrically-shaped core which does not potentially damage the slot liners.

SUMMARY OF THE INVENTION

A stator for a dynamoelectric machine according to the present invention includes a generally cylindrically-shaped stator core having a plurality of circumferentially spaced and axially-extending core slots in a surface thereof. The core slots extend between a first and a second end of the stator core. The stator also includes a multi-phase stator winding. Each of the phases includes a plurality of slot segments disposed in the core slots that are alternately connected at the first and second ends of the stator core by a plurality of end loop segments. The slot segments and likely the end loop segments of a high slot fill winding are typically rectangular in cross sectional shape. The end loop segments of the winding may be interlaced or cascaded. An interlaced winding includes a majority of end loop segments that connect a slot segment housed in one core slot and in one radial position with a slot segment housed in another core slot in a different radial position. The term radial position, utilized herein, refers to the position of a slot segment housed in the core slots with respect to the other slot segments housed in the same core slot—i.e. the outermost slot segment housed in a core slot is defined as being located in the outermost radial position, the second outermost slot segment housed in a slot is defined as being located in the second outermost radial position, and so forth. A cascaded winding includes a majority of end loop segments, which connect a slot segment housed in a radial position of a core slot with another slot segment housed in the same radial position of another core slot. A portion of a phase is defined as a conductor having at least three consecutive slot segments connected by at least two end loop segments and a portion is further defined by its slot segments being housed in a particular radial position—i.e. a portion of a phase having slot segments housed in the outermost radial position is defined as an outermost portion of the phase. A cascaded winding also includes, for the portions of all of phases located in the same general circumferential location, radial alignment of all of the portions which have slot segments located in the same radial position, which allows for sequential radial insertion of these portions for each phase—i.e. for the outermost portions of all of phases located in the same general circumferential location, an outermost portion of one phase could be completely radially inserted into the core slots prior to an outermost portion of a second phase, which could be completely radially inserted into the core slots prior to an outermost portion of a third phase and so forth. A cascaded winding also includes, for the portions of all of phase located in the same general circumferential location, radial alignment of all of the groups of portions wherein each group of portions includes all of the portions having slot segments located at a particular radial position, which allows for sequential radial insertion for all of these groups of portions—i.e. for the portions of all of phase located in the same general circumferential location, the outermost portion of all of the phases could be radially inserted into the core slots prior to the second outermost portion of all of the phases, which could be radially inserted prior to the third outermost portion of all of the phases and so forth.

The slot liner insulation must protect the slot segments from the sides of the slot as well as the back of the slot. The slot liner is placed between the walls of the core slot and the slot segments of the windings. It protects the wire from electrically grounding to the core during the process of making the stator as well as for the life of the stator in operation.

The typical process is to insert the slot liner material into the core slots and then radial insert the winding into the insulated core slots. For the continuous winding, cascaded or interlaced, the slot segments of the winding are desired to be substantially radially inserted from the inner diameter of the stator core through the slot opening to a final position of being housed into the insulated slots. During the insertion process, the slot segments must pass by the inner edge of the slot liner. If the slot liner is not properly secured to the sides of the slots, the edge of the slot liner may be caught by the slot segments and thereby compromising the integrity of the required electrical isolation between the slot segments and the core slot. If this were to happen, the slot segment becomes exposed to the steel of the core slot leading to a winding with an electrical ground and thereby resulting is a defective stator assembly. The potential for this defect to occur is increased for a high slot fill stator assembly because a high slot fill stator requires a thin slot liner and a thin slot liner has less inherent spring force and therefore is less secured to the edges of the core slot. A high slot fill stator assembly requires an insulator thickness that is less than 0.2 millimeter thick. The insulator thickness is defined as to not include any thickness inherent to an adhesive that may be applied to the insulator or in between the insulator and the sides of the core slots. The potential for this defect to occur is also increased when rectangular shaped slot segments are inserted the core slots because the corner of the slot segments can easily catch the edge of the slot liner. For this reason, the rectangular shaped slot segments may often have a radius between two adjacent edges to eliminate the corner. The potential for this defect to occur is also increased when the flexibility of the slot segment is large enough such that during the insertion process, the slot segment flexes in the circumferential direction and thereby interfering with and catching the slot liner edge. The flexibility becomes an issue when the circumferential width of the slot segments is less than two millimeter. The potential for this defect to occur is also increased for the cascaded winding compared to the interlaced winding because the interlaced winding is comprised of a majority of end loop segments which each connect a slot segment housed in a forward radial position with a slot segment housed in a rearward radial position which results in a "locking" effect of all of the end loop segments and slot segments, which creates a very rigid winding wherein the flexibility of the slot segments is reduced.

The purpose of this patent is to solve this issue by properly securing the slot liner to the sides of the slot before the slot segments are inserted into the slots. One solution to secure the slot liner to the sides of the core slots is to bond the slot liner to the sides of the core slots with an applied adhesive. Alternatively, tooling may be placed in the slot that has a similar circumferential width as the insulated wire, prior to inserting the slot segments into the core slots. This tooling presses and secures the slot liner to the sides of the slot prior to the winding insertion process. Alternatively, the slot liner material may be formed of a laminate wherein the thin insulator is laminated or coated to another material that has high spring properties, such as steel. The material with high spring properties causes the U-shaped laminate to "open" thereby pressing and securing the insulator to the sides of the core slot. Alternatively, the slot liner material might be replaced by a very thin coating on the stator core that inherently is bonded and secured to the sides of the core slots. The coating would necessarily be thinner than 0.2 millimeter to allow for a high slot fill winding.

The design of the stator assembly along with the process of radial insertion of the windings in accordance with the present invention advantageously eliminates the potential of catching the edge of the slot liner, thereby damaging the integrity of the insulation and thereby leading to an electrical ground between the windings and the core. The slot liner is not potentially damaged because it is placed securely against the sides of the slot during the insertion process. In a first embodiment of the present invention, the slot liner is adhered to the sides of the slots. In a second embodiment of the present invention, tooling is inserted into the insulated slots prior to inserting any slot segments. In a third embodiment of the present invention, the slot liner insulation material is adhered to a thin sheet of a spring material, for example steel. In the fourth embodiment of the present invention, the slot liner material is replaced by a very thin coating.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 4 is a perspective view of a sheet type insulator with an adhesive on the surface of the insulator in accordance with the present invention;

FIG. 5 is a cross sectional view of an insulated slot and tooling housed in the slot and slot segments located in position prior to radial insertion into the core slot in accordance with the second embodiment of the present invention;

FIG. 6 is cross sectional view of the insulated slot, tooling and slot segments of FIG. 5 except the slot segments are shown in process of being radial inserted into the insulated slot in accordance with the second embodiment of the present invention;

FIG. 7 is a perspective view of a laminated member having an insulator disposed at the inner surface and a spring material disposed at the outer surface in accordance with the fourth embodiment of the present invention;

FIG. 8 is a cross sectional view of a core slot including a thin coating in accordance with the fourth embodiment of the present invention;

FIG. 9b (7a) is a perspective view of a plurality of layers of end loop segments of a stator winding in accordance with the present invention including the layer of FIG. 9a;

DESCRIPTION OF THE PREFERRED EMBODIMENT

Figure 1:
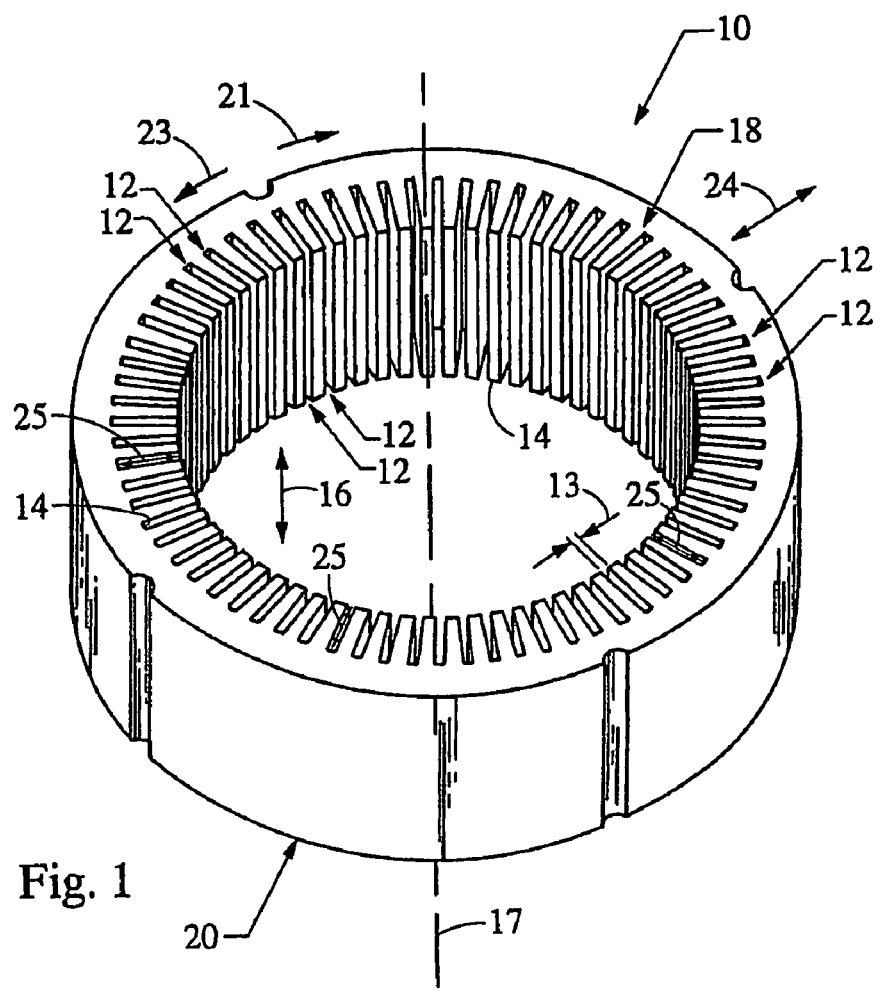
FIG. 1 is a perspective view of a stator core in accordance with the present invention.

Referring now to FIG. 1, a generally cylindrically-shaped stator core is indicated generally at 10. The stator core 10 includes a plurality of core slots 12 formed in a circumferential inner surface 14 thereof. The core slots 12 extend in an axial direction, indicated by an arrow 16, parallel to the central axis 17 of the stator core 10 between a first end 18 and a second end 20 thereof. An axially upward direction is defined as moving toward the first end 18 of the stator core 10 and an axially downward direction is defined as moving toward the second end 20 of the stator core 10. Preferably, the core slots 12 are equally spaced around the circumferential inner surface 14 of the stator core 10 and the respective inner surfaces 14 of the core slots 12 are substantially parallel to the central axis 17. A circumferential clockwise direction is indicated by an arrow 21 and a circumferential counterclockwise direction is indicated by an arrow 23.

The core slots 12 define a radial depth 25 along a radial direction, indicated by an arrow 24, and are adapted to receive a stator winding, discussed in more detail below. A radial inward direction is defined as moving towards the central axis 17 of the stator core 10 and a radial outward direction is defined as moving away from the central axis 17. The core slots 12 may have a rectangular cross sectional shape as can be seen in FIG. 1.

Figure 2:
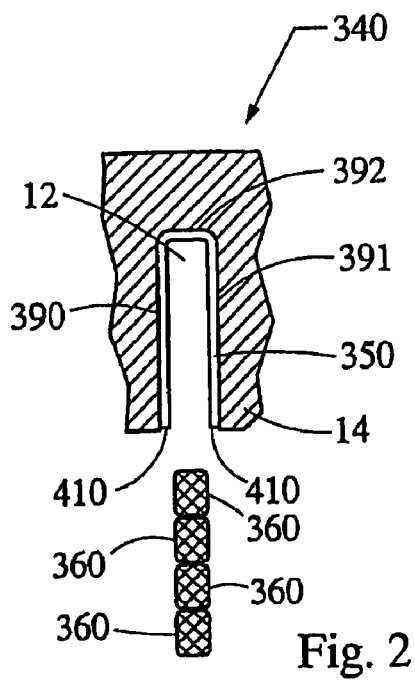
FIG. 2 is a cross sectional view of a core slot of FIG. 1, housing an insulator and having slot segments located in a position prior to radial insertion into the core slot in accordance with the present invention.

Referring now to FIG. 2, an insulated slot, indicated generally at 340, is shown. The phrase insulated slot, utilized herein, is defined as a core slot 12 of FIG. 1 including an insulator, indicated generally at 350. The insulator 350 is adapted to fit the two sides, indicated generally at 390 and 391, as well as the back side, indicated generally at 392 of the core slot 12. The insulated slot 340 has a substantially rectangular shape meaning that it has two substantially parallel sides 390 and 391 as well as a back side 392. For those skilled in the art, it is known that the term rectangular shaped core slot may include radii on the corners intermediate two adjacent edges of the core slot 12 and may include a special slot opening at the inner surface 14, described in more detail below.

The slot segments 360 are shown in a pre-inserted position aligned in one row aligned in the radial direction 24 presented radially inward of the insulated slot 340 of the core 10. Preferably, the width, including any insulation, of the slot segments 360 fit closely to the width of the insulated slot 340. Preferably, each of the slot segments 360 are formed from a rectangular conductor and have a rectangular shape, however, other shapes could also be employed such as round, elliptical or square. For those skilled in the art, it is known that a square shaped conductor is considered a rectangular shaped conductor and typical rectangular conductors may include radii on the corners intermediate two adjacent edges. The slot segments 360 will be inserted in the radial direction 24 so that they are housed into the insulated slots 340 aligned in at least one row aligned in the radial direction 24, best seen in FIG. 3. During the radial insertion process, the slot segments 360 have the potential of catching the inner edges, indicated generally at 410, of the insulator 350. If the slot segments 360 catch one of the edges 410 of the insulator 350, the insulator 350 will become damaged which will jeopardize the functionality of the insulator 350, which is to electrically isolate the slot segments 360 from the core slots 12.

Figure 3:
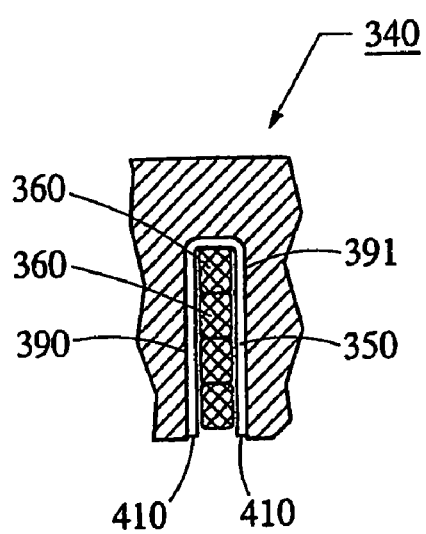
FIG. 3 is a cross sectional view of a core slot of the stator core of FIG. 1, housing slot segments and an insulator in accordance with the present invention.

Referring again to FIG. 3, the slot segments 360 are shown in their final position after insertion into an insulated slot 340. As can be seen in FIG. 3, after a proper radial insertion, the insulator 350 is undamaged and therefore, the slot segments 360 are properly electrically isolated from the core slot 12. To prevent the slot segments 360 from catching one of the edges 410 of the insulator 350, the insulator 350 is properly secured to the sides 390 and 391 of the core slot 12. A properly secured insulator 350 can best be seen in FIG. 2 wherein the insulator 350 fits closely, to the sides 390 and 391 of the core slot 12 with no apparent air gap between the sides 390 and 391 of the core slot 12 and the insulator 350.

One method to secure the insulator 350 to the sides 390 and 391 of the core slot 12 is to apply an adhesive in between the insulator 350 and the sides 390 and 391 of the core slots 12. Prior to inserting the insulators 350 into the core slots 12, the adhesive may be applied to the insulators 350, to the sides 390 and 391 of the core slots 12 or to both the insulator 350 and the sides 390 and 391 of the core slots 12.

Referring now to FIG. 4, a sheet type insulator 351 is shown prior to insertion into a core slot 12. The outer surfaces, indicated generally at 355, of the sheet insulator 351 are shown as being the outer surfaces of the sheet insulator 351 that upon insertion into a core slot 12, will mate with the sides 390 and 391 of a core slot 12. The sheet insulator 351 is shown with an adhesive 357 applied to the outer surfaces 355. Although the adhesive 357 is not required on the surface of the sheet insulator 351 that mates to the back side 392 of the core slot 12, for ease of manufacture it may indeed also be applied to this surface. The preferred method to apply an adhesive 357 to the sheet insulator 351, is to apply a B-stage adhesive to the outer surface 355 of the sheet insulator 351 in its flat shape prior to forming into the U-shape. The term B-stage, utilized herein, refers to an adhesive 357, which is semi-cured during the process of inserting the insulator 350 into the core slot 12. The B-stage adhesive 357 is semi cured so that the adhesive 357 is dry to the touch and therefore easy to handle in production. After the sheet insulators 351 are inserted into the core slots 12 the outer surface 355 is pressed against the sides 390 and 391 of the core slots 12 and the B-stage adhesive 357 is heated to a curing temperature. At this curing temperature, the B-stage adhesive 357 flows and after a predetermined amount of time it cures, thereby bonding and securing the sheet insulator 351 to the sides 390 and 391 of the core slots 12.

Now referring to FIG. 5, a second embodiment of the present invention is shown as an insulated core slot 340 having tooling, indicated generally at 330, inserted into the insulated slots 340 prior to inserting the slot segments 360. The circumferential width of the tooling 330 preferably fits closely to the width of the insulated slot 340. To prevent the tooling 330 from catching the edges 310 of the insulator 350, similarly to the slot segments 360 catching the edges 310, the tooling 330 includes a point, indicated generally at 332, and is inserted in the radial direction 24 into the core slots 12.

Alternatively, the tooling 330 could include a point (not shown) on the axial end of the tooling 330, wherein the tooling 330 is inserted in the axial direction 16 into the core slots 12. In either case, radial point 332 or axial point (not shown), the point enters the core slots 12 prior to the rest of the tooling 330 which ensures that the edges 290 and 291 of the insulator 350 are not caught by the tooling 330.

After insertion of the tooling 330, the tooling 330 secures the insulator 350 to the sides 390 and 391 of the core slots 12. The winding having slot segments 360 is then inserted in the radial direction 24 into the insulated slot 340 with no danger of the slot segments 360 catching the edges 410 of the insulator 350. The tooling 330 may retract from the core slots 12 in the axial direction 16 just after the outermost slot segment 360 passes by the inner edges 410 of the insulator or the tooling 330 may extend outwardly in the radial direction 24 in the core slots 12 for a portion of the core slots 12 prior to retracting in the axial direction 16 from the core slots 12. The slot segments 360 may be the driving force that moves the tooling 330 in the radial direction 24 for a portion of the core slots 12, best seen in FIG. 6.

Referring again to FIG. 6, the insulated slot 340, tooling 330 and slot segments 360 are shown according to FIG. 5 except the slot segments 360 and tooling 330 are shown mid-way through an insertion process in the radial direction 24. As can be seen, the tooling 330 secures the insulator 350 to the sides 390 and 391 of the core slots 12 and guides the slot segments into the insulated slot 340 without allowing the slot segments 360 to catch the inner edges 410 of the insulator 350. Once the outermost slot segment of slot segments 360 enters the insulated slot 340 beyond the inner edges 410, the outermost slot segment acts as a guide and secures the insulator 350 to the sides 390 and 391 of the core slots 12 for the insertion of the subsequent slot segments 360, such as the second outermost slot segment of the slot segments 360. At this point, the tooling 330 may retract in the axial direction 16 or the tooling 330 may be pushed further in the radial direction 24. However, before the outermost segment of slot segments 360 is extended to the final position, the tooling 330 must be retracted in the axial direction 16.

Referring now to FIG. 7, a laminate, indicated generally at 500, of a third embodiment of the present invention is shown. The laminate 500 is composed of at least two members, an insulator member, indicated generally at 510 and a spring member, indicated generally at 520 which are laminated or adhered together, typically by an adhesive applied in between the members 510 and 520. After assembly into a core slot 12, the insulator member 510 provides the necessary electrical isolation between the slot segments 360 and the core slots 12 and the spring member 520 provides a spring force, which secures the laminate 500 to the sides 390 and 391 of the core slots 12. The memory properties inherent to the properties of the spring member 520 cause the laminate 500, prior to insertion into a core slot 12, to have an angle, indicated generally at 540, between opposing sides of the laminate 500 to be greater than zero.

When the laminate 500 is inserted into a core slot 12, the sides 390 and 391 of the core slot 12 force the angle 540 narrow and to substantially approach zero degrees. This change of the angle 540 causes the laminate 500, to have an internal force, which pushes and secures the laminate 500, including the insulator member 510, to the sides of the core slot 390 and 391. Therefore, the slot segments 360 can now be inserted into the cores slots 12 housed with laminates 500 without the potential of catching the inner edges, edges similar to the inner edges 410 of insulator 350, of the insulator member 510.

Since the insulation member 510 provides all of the required electrical isolation between the slot segments 60 and the core slot 12, the spring member 520 may be composed of a material that provides further electrical isolation or it may be composed of a material that provides little to no electrical isolation, such as steel, aluminum or such. Furthermore, to enhance the magnetic flux carrying capabilities of the core, the spring member 520 may be composed of a magnetic permeable material, such as, but not limited to, low carbon steel.

Referring now to FIG. 8, a fourth embodiment to the present invention is shown as an insulated core slot 340 wherein the insulation is composed of a coating, indicated generally at 460 having a very thin thickness, generally indicated at 470. The coating must be thin to allow for a high slot fill winding having minimum insulation in the core slots 12 and to prevent the buildup on the inner surface 14 of the core 10 which could potentially interfere with the spinning rotor which is located radially inward of the inner surface 14. The high slot fill stator assembly, by definition, has very thin insulation and therefore to be considered a high slot fill stator, the thickness 470 of the coating 460 must be less then 0.2 millimeter.

Figure 9:
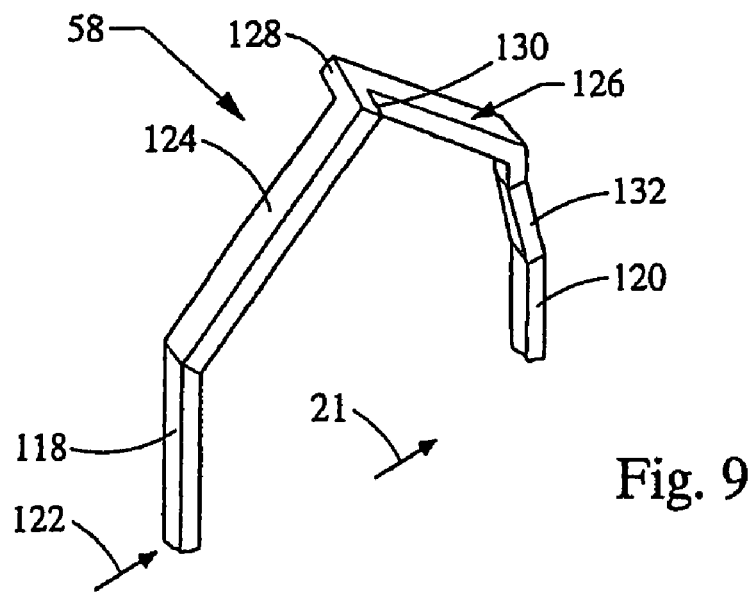
FIG. 9 (5) is a perspective view of an end loop segment of a portion of a stator winding in accordance with the present invention.
Figure 9A:
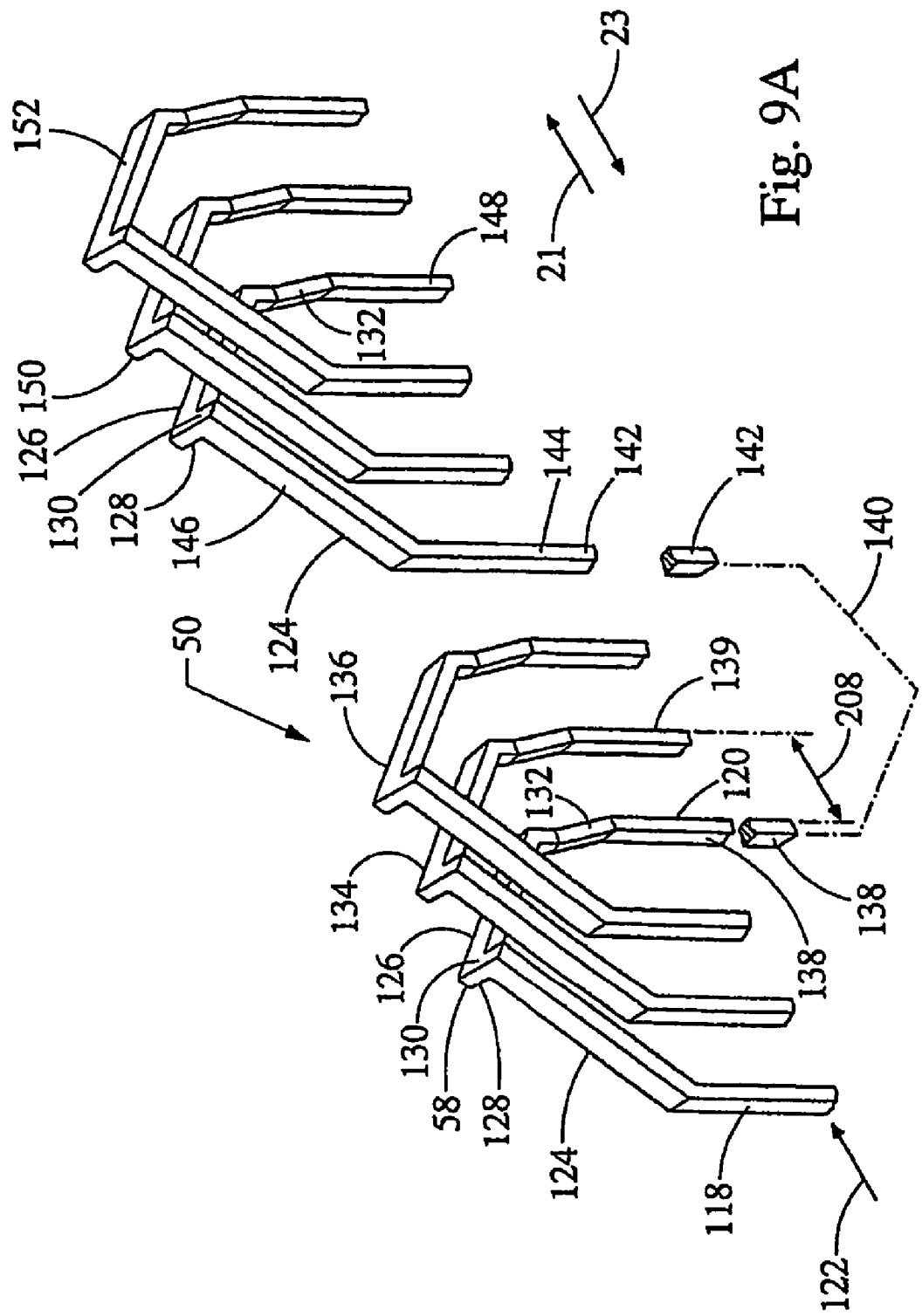
FIG. 9a (6) is a perspective view of a layer of end loop segments of a portion of a stator winding in accordance with the present invention including the end loop segment of FIG. 9.
Figure 9C:
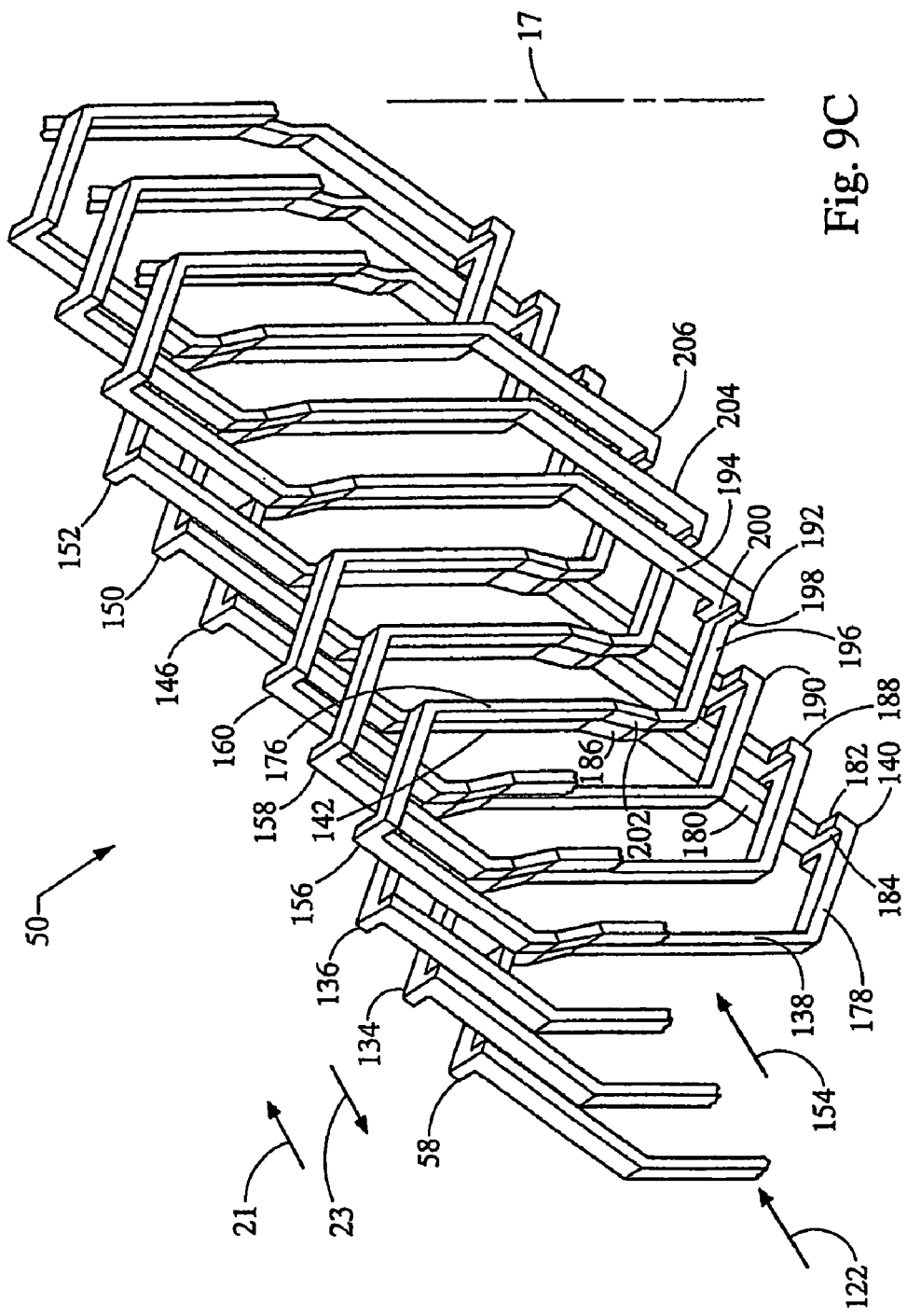
FIG. 9c (7b) is a perspective view of a plurality of layers of end loop segments of the stator winding shown in FIG. 9b including a plurality of slot segments and end loop segments in accordance with the present invention.

The cascaded winding for the stator is shown in FIGS. 9 through 9c. Each of the continuous conductors have a plurality of slot segments disposed in the core slots 12. The term continuous, utilized herein, refers to a conductor including end loops segments and slot segments that extends circumferentially around the core for at least one half of one revolution and is formed from one conductor without any welds or connections. The slot segments are alternately connected at the first and second ends 18, 20 of the stator core 10 by a plurality of end loop segments. Each of the slot segments of a particular layer are located in the same radial position in the core slots 12 and the end loop segments form a cascaded winding pattern. The term layer, utilized herein, refers to a portion of a conductor which extends circumferentially around the core including at least two end loop segments which connect at least three slot segments wherein the slot segments are located in the same radial position.

Referring now to FIG. 9, the end loop segment, indicated generally at 58, is adapted to be a part of the stator winding and includes a first slot end portion 118 and a second slot end portion 120 that are each proximate to a respective slot segment, discussed in more detail below, of the stator winding. The first end portion 118 and the second end portion 120 of the end loop segment 58 are at a substantially same radial distance from the central axis 17 of the stator core 20. The first end portion 118 and the second end portion 120 form a portion of a layer, indicated generally at 122, of the stator winding whose slot segments are located in the same radial position and are in a same substantial radial distance from the central axis 1.7 of the stator core 10. Although end portions, such as 118 and 120, are described as entities, they may, in fact, just be portions of the slot segments, discussed in more detail below.

The end loop segment 58 includes a first sloped portion 124 and a second sloped portion 126 that meet at an apex portion 128. The first sloped portion 124 is substantially co-radial with the slot segments of layer 122, the first end portion 118 and the second end portion 120. The second sloped portion 126 is substantially non-co-radial with the slot segments of layer 122, the first end portion 118 and the second end portion 120. The apex portion 128 includes a first radial extension portion 130. The first radial extension portion 130 extends from the first sloped portion 124 in the radially outward direction, which provides a radial outward adjustment for the end loop segment 58. A second radial extension portion 132 connects the second sloped portion 126 and the second end portion 120. The second radial extension portion 132 extends from the second sloped portion 126 in the radially inward direction, which provides a radial inward adjustment for the end loop segment 58. Although the radial extension portions, such as 130 and 132, shown in FIG. 9, 9*a*, 9*b* and 9*c* appear as sharp bends, it is obvious to those skilled in the art that typical radial extension portions would be more gentle in nature and include radii, not shown.

While the end loop segment 58 has been shown wherein the radial outward adjustment is adjacent the apex portion 128 and the radial inward adjustment is adjacent the second sloped portion 126, those skilled in the art can appreciate that the radial outward and inward adjustments can be on any one or on any two of the first sloped portion 124, the second sloped portion 126, and the apex portion 128 in order to provide the cascaded winding pattern, described in more detail below.

Referring now to FIG. 9*a*, the end loop segment 58 of FIG. 9 is shown adjacent a plurality of substantially identical end loop segments, indicated generally at 134 and 136. The end loop segments 58, 134, and 136 each form a portion of the layer 122 of the stator winding, indicated generally at 50. The end loop segments 58, 134, and 136 are shown in a three-phase winding pattern but those skilled in the art will appreciate that the end loop segments 58, 134, and 136 may be formed in, for example, a six-phase winding pattern, or any other winding pattern advantageous for producing electricity or for generating torque, as in the case of an electric motor. In a three-phase winding the end loop segments have a pitch equal to three as can be best seen in FIG. 9*a* where end loop segment 140 connects a slot segment 138 disposed in a first core slot with another slot segment 142 disposed in a core slot which is located three core slots from the first core slot. In a six-phase winding (not shown), the end loop segments have a pitch equal to six. A winding, having an end loop segment pitch equal to six, increases the potential of the slot segments to catch the edge of the slot liner paper during insertion because a six-pitch winding requires twice as many core slots and slot segments and therefore each slot segment must have a smaller circumferential width (approximately ½ the width compared to a three-pitch winding). Consequently, the slot segments are more flexible in a winding having end loop segments with a pitch equal to six compared to a winding having end loop segments with a pitch equal to three. The end loop segments 58, 134, and 136 are preferably each disposed at the first end 18 of the stator core 10.

The portion 120 attaches to a first slot segment, shown schematically at 138, which extends through a one of the core slots 12 to the second end 20 of the stator core 10. As the first slot segment 138 exits the second end 20, the first slot segment 138 is attached to an end of another end loop segment, shown schematically at 140, which is described in more detail below. The end loop segment 140 is attached at another end to a second slot segment, shown schematically at 142. The second slot segment 142 extends upwardly through another one of the core slots 12 of the stator core 10 and attaches to a portion 144 of an end loop segment 146, which is substantially identical to the end loop segments 58, 134, and 136. Similarly, a portion 148 of the end loop segment 146 connects to another slot segment, discussed in more detail below. The pattern of connecting end loop segments 58, 140, and 146 and slot segments, such as the slot segments 138 and 142, as outlined above, continues about the circumference of the stator core 10 to form a first layer, such as the layer 122, of a single phase of the stator winding 50.

The end loop segment 146 is shown adjacent a plurality of substantially identical end loop segments, indicated generally at 150 and 152. The end loop segments 146, 150, and 152 are each connected to a corresponding plurality of slot segments, discussed in more detail below, such as the slot segment 142, which is disposed in a respective core slot 12 of the stator core 10. The slot segments are attached to a plurality of end loop segments, discussed in more detail below. The end loop segments 134, 136, 150, and 152, when attached to the slot segments and end loop segments, each form a respective continuous first layer of the complete stator winding 50 that is wound about the circumference of the stator core 10.

Preferably, each of the slot segments 138 and 142 and each of the end loop segment 58, 134, 136, 140, 146, 150, and 152 are formed from a rectangular wire and have a cross-sectional shape having a substantially constant circumferential width and radial width and therefore substantially equal area, however, other shapes could also be employed such as round, triangular or elliptical. For those skilled in the art, it is known that a square shaped conductor is considered a type of a rectangular shaped conductor and that a typical rectangular conductor may include radii on the corners intermediate two adjacent edges.

Referring now to FIGS. 9*b* and 9*c*, the first layer 122 of the end loop segments 58, 134, 136, 146, 150, and 152 of FIG. 9*a*, is shown with a second layer of end loop segments indicated generally at 154. The layer 154 is located radially inward of the layer 122 at a predetermined radial distance from the layer 122. The second layer 154 includes a plurality of end loop segments, indicated generally at 156, 158, and 160. The layers 122 and 154 together form a portion of the stator winding, indicated generally at 50. The conductor of the second layer 154 including the end loop segment 156 is similar to the conductor of the first layer 122 including the end loop segment 58 except that it is inserted into the core slots 12, shifted by a predetermined number of slots, discussed in more detail below, and it has end loop segments on a first end 18 of the stator core 10, such as the end loop segment 156, that extend radially outwardly at the apex portion 170 in the counterclockwise direction 162, which is opposite the end loop segments, such as the end loop segment 58, of the first layer 122, which extend radially outwardly at the apex portion 128 in the clockwise direction 164.

The end loop segment 156 includes a first sloped portion 166 and a second sloped portion 168 connected by an apex portion 170. The first sloped portion 166 is substantially co-radial with the slot segments of the second layer 154, the first end portion 165 and the second end portion 167. The second sloped portion 168 is substantially non-co-radial with the slot segments of the second layer 154, the first end portion 165 and the second end portion 167. The apex portion 170 includes a first radial extension portion 172. The first radial extension portion 172 extends from the first sloped portion 166 in the radially outward direction, which provides a radial outward adjustment for the end loop segment 156. A second radial extension portion 174 connects the second sloped portion 168 and the second end portion 167. The second radial extension portion 174 extends from the second sloped portion 168 in the radially inward direction, which provides a radial inward adjustment for the end loop segment 156.

As can best be seen in FIG. 9*b*, the non-co-radial portion 168 of end loop segment 156 extends radially outward where it becomes substantially co-radial with the slot segments first layer 122, the first end portion 118 and the second end portion 120, but because it is shifted by a predetermined number of slots, it does not violate the space of the end loop segments of the first layer 122. This allows the end loop segments of the two layers, 122 and 154 to cascade together forming a two layer (per phase) winding 50, which extends radially outward by one substantial wire width beyond the slot segments of the first layer 122 but does not substantially extend radially inward beyond the slot segments of the innermost layer 154.

For a winding with a plurality of layers for each phase, a third layer (not shown) which is substantially identical to the first layer 122, would have non-co-radial portions that would extend radially outward and be substantially co-radial with the slot segments of the second layer 154 and therefore cascade with the second layer 154. For a pattern where the radial layers alternate between being substantially identical with the first layer 122 and the second layer 154, a pattern develops where the winding 50 only extends radially outward by one substantial wire width of the slot segments of the outermost layer 122 but not radially inward of the slot segments of the innermost layer. This cascading effect allows a winding 50 with a plurality of layers for each phase to be inserted into a stator core 10, that extend radially outwardly by one substantial wire width while not extending radially inwardly. The end loop segments 158 and 160 are substantially identical to the end loop segment 156. The radial outward and inward adjustments for the layers 122, 154 form a cascaded winding pattern shown in FIGS. 9b and 9c.

Referring to FIG. 9c, the first layer 122 and the second layer 154 are shown with a plurality of slot segments 176, which are substantially identical to the slot segments 138 and 142. The end loop segment 140 of FIG. 9a is shown having a first sloped portion 178 and a second sloped portion 180 connected by an apex portion 182. The first sloped portion 178 is substantially co-radial with the slot segments 138 and 142 of the first layer 122. The second sloped portion 180 is substantially non-co-radial with the slot segments 138 and 142 of the first layer 122. The apex portion 182 includes a first radial extension portion 184. The first radial extension portion 184 extends from the first sloped portion 178 in the radially outward direction, which provides a radial outward adjustment for the end loop segment 140. A second radial extension portion 186 connects the second sloped portion 180 and the slot segment 142. The second radial extension portion 186 extends from the second sloped portion 180 in the radially inward direction, which provides a radial inward adjustment for the end loop segment 140. The end loop segments 188 and 190 are substantially identical to the end loop segment 140.

Similarly, an end loop segment 192 of the second layer 154 is shown adjacent the end loop segment 190 of the first layer 122. The end loop segment 192 includes a first sloped portion 194 and a second sloped portion 196 connected by an apex portion 198. The first sloped portion 194 is substantially co-radial with the slot segments 176 of the second layer 154 of the second layer 154. The second sloped portion 196 is substantially non-co-radial with the slot segments 176 of the second layer 154. The apex portion 198 includes a first radial extension portion 200. The first radial extension portion 200 extends from the first sloped portion 194 in the radially outward direction, which provides a radial outward adjustment for the end loop segment 192. A second radial extension portion 202 connects the second sloped portion 196 and the slot segment 176. The second radial extension portion 202 extends from the second sloped portion 196 in the radially inward direction, which provides a radial inward adjustment for the end loop segment 192. The end loop segments 204 and 206 are substantially identical to the end loop segment 192.

The slot segments, such as 138, 142, and 176 of each phase of the stator winding 50 are preferably disposed in respective core slots 12 at an equal slot pitch around the circumference of the stator core 10. Specifically, a slot segment of a phase, such as the slot segment 138, is disposed in a respective core slot 12 adjacent a slot segment 139 of the adjacent phase. The respective slot segments 138 and 139 are spaced apart by a circumferential distance or slot pitch 208, best seen in FIG. 9a. The circumferential slot pitch 208 is substantially equal to the circumferential distance between a pair of adjacent core slots 12 in the stator core 20. Each of the slot segments and end loop segments of the phase including the slot segment 138 remain disposed adjacent the respective slot segments and end loop segments of the phase including the slot segment 139 at the same circumferential slot pitch 208 throughout the length of the stator winding 50 and throughout the circumference of the stator core 20.

While the slot segments 176 are shown generally coplanar in FIGS. 9b and 9c for illustrative purposes, the slot segments 176 are preferably adapted to be received by a radially curved surface, such as the interior surface of the stator core 10 and, therefore, are not coplanar but are co-radial. The width of each of the slot segments 176, including any insulation, preferably fits closely to the width of the core slots 12, including any insulation.

Figure 10:
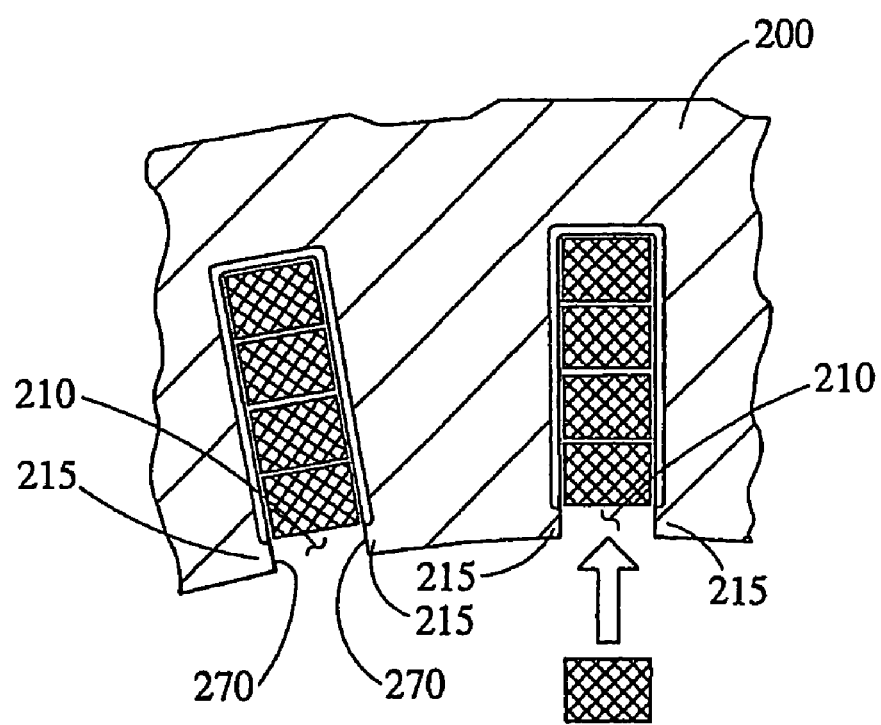
FIG. 10 is a partial view of one embodiment of a core slot from the stator of FIG. 1 in accordance with the present invention.

A further embodiment to help secure the insulator members to the sides of the core slots 12 can be seen in FIG. 10. Referring to FIG. 10, the stator core 200 includes a core slot 210 having teeth 215 with caps 270 that create a slot opening 220 between each other that is smaller in width than a main portion of the core slot 210. The caps 270 include projections 240 along an inner diameter 230 of the stator core 200. Thus, the slot opening 220 is delimited along the inner surface of the stator core 200 by adjacent projections 240. As such, the slot opening 220 is only slightly larger than a width of a slot segment 222 to be inserted there between these projections 240.

The core slot 210 is lined along an inner surface by an insulating slot liner or insulation member 250 that may be fixedly received by the core slot 210 prior to insertion of the slot segments 222. The insulating slot liner 250 has a pair of leg members 260 extending from a back end 262 to the radial outer edges of the corresponding projections 240. As such, the slot liner 250 may have substantially equal leg members 260 that do not extend to the inner diameter 230 of the stator core 100. The extending leg members 260 accordingly terminate at free ends 280. The inward edges of each of the free ends 280 are preferably at a substantially equal distance from the back end 262.

Still referring to FIG. 10, opposing projections 240 define a width 220 substantially equal to a width of the slot liner 250, and are such that their respectively delimited slot opening 220 is slightly larger than a width of a slot segment 222 to be inserted into the lined stator core slot 210. Therefore, the free ends 280, when the slot liner 250 is in the installed position, form a gap there between that is also substantially equal to or slightly larger than the width of the width of a conductor wire 222. A width of each of the opposing projections 240 is substantially equal to a width of the slot liner 250. The insulating slot liner 250, which may be a form of paper, paper composite, or any other form of insulation having electrically insulating properties, may be glued to the inside of the core slot 210 prior to loading the stator winding. Further, the insulating slot liner 250 may be a coating applied to the inner surface of the core slot 210. The insulating slot liner 250 may not include an extension that lines the slot opening 220 between the projections 240. The projections 240 help secure the insulator members 250 to the sides of the core slots 12 by covering the inner edges 110 of the insulator members 250.

Figure 11:
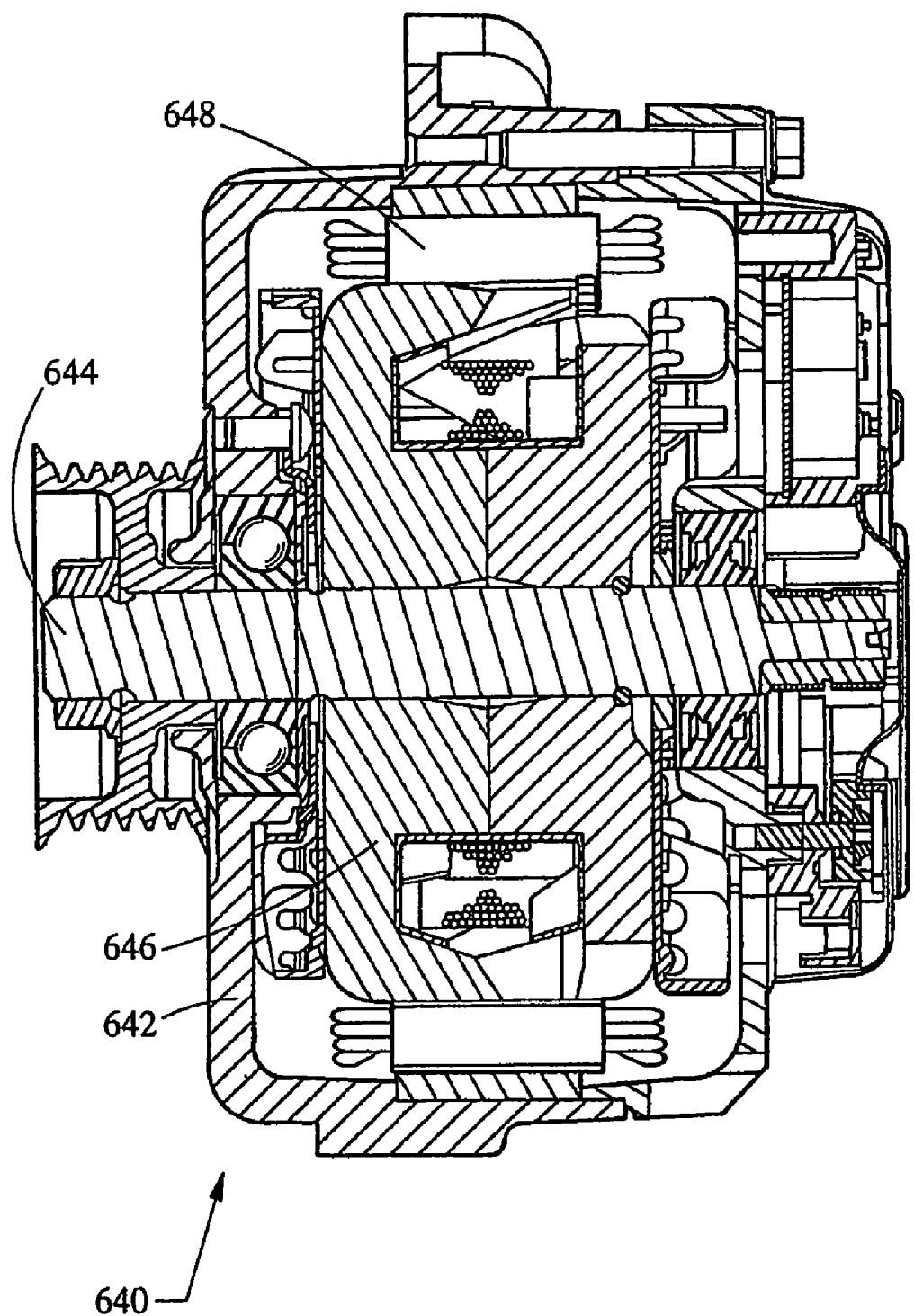
FIG. 11 is a cross sectional view of an alternator in accordance with the present invention.

Referring now to FIG. 11, a dynamoelectric machine in accordance with the present invention is indicated generally at 640. The dynamoelectric machine is preferably an alternator, but those skilled in the art will appreciate that the dynamoelectric machine can be, but is not limited to, an electric motor, a starter-generator, or the like. The dynamoelectric machine 640 includes a housing 642 having a shaft 644 rotatably supported by the housing 642. A rotor assembly 646 is supported by and adapted to rotate with the shaft 644. The rotor assembly can be, but is not limited to, a "claw pole" rotor, a permanent magnet non claw pale rotor, a permanent magnet claw pole rotor, a salient field wound rotor or an induction type rotor. A stator assembly 648 is fixedly disposed in the housing 642 adjacent the rotor assembly 646. The stator assembly 648 includes a stator core, such as the stator core 10 and a winding, such as the stator winding 50.

Figure 12:
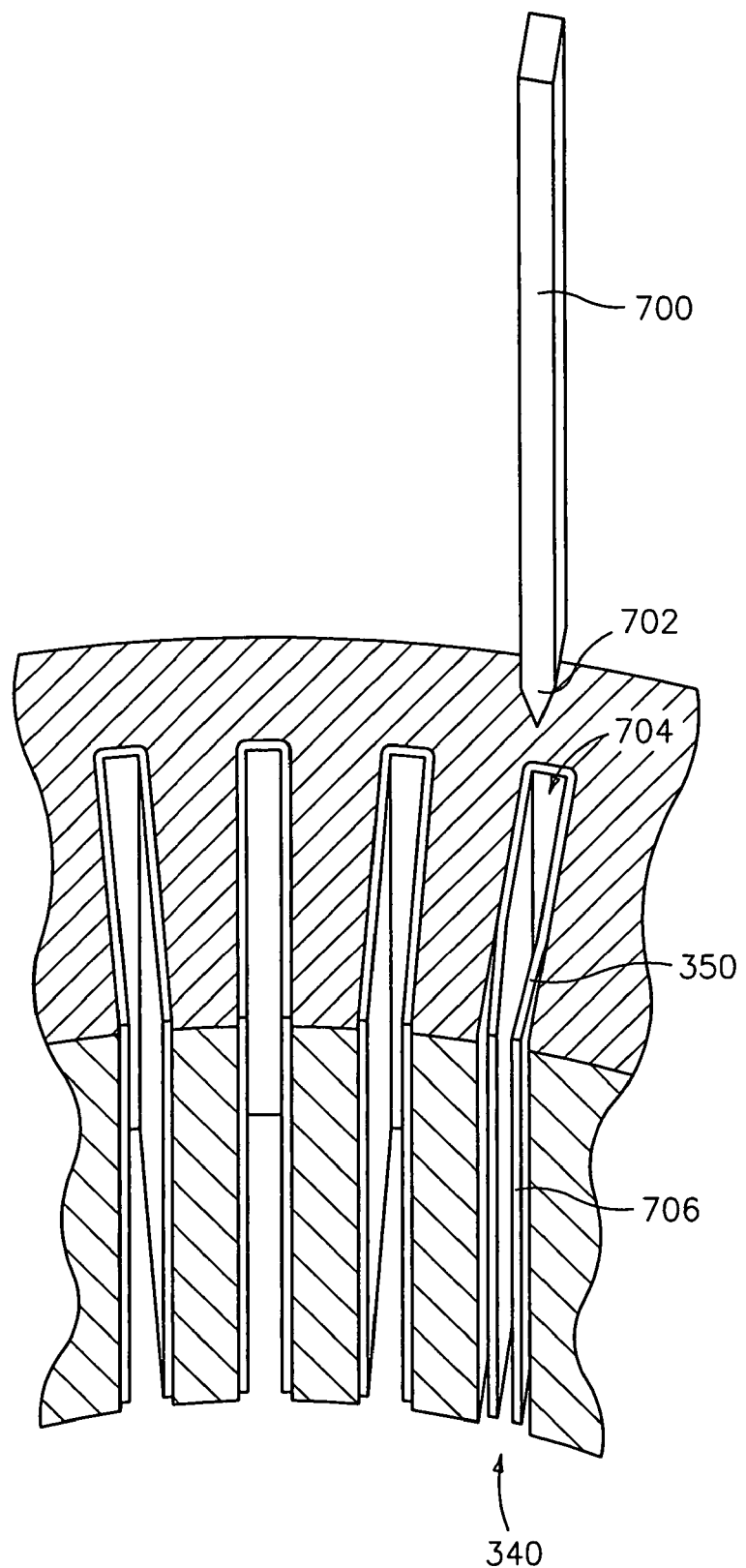
FIG. 12-14 are a sequential representation of a portion of a stator core and a blade penetrating a slot in the core in a specific position.
Figure 14:
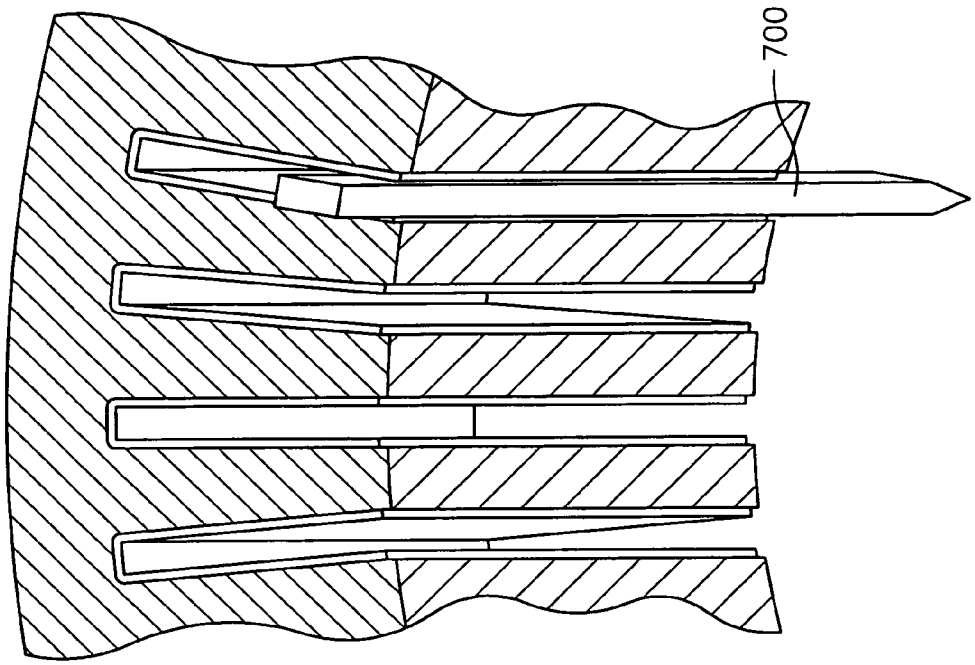
Figure 13:
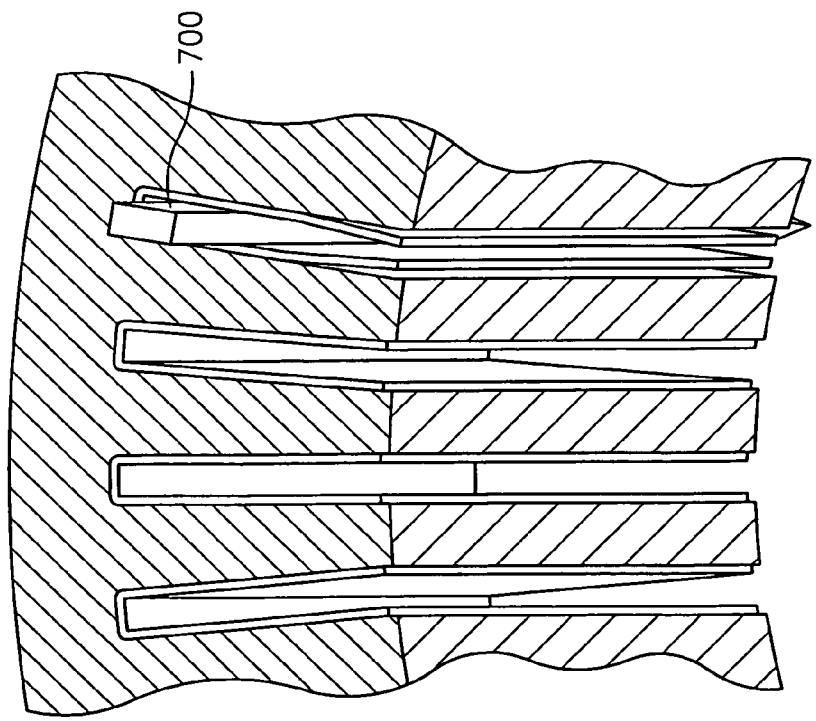

Alternatively to the FIG. 5 embodiment, and alluded to in paragraph 33 above, it is possible to utilize a blade structure 700 that is insertable into the stator slots in an axial direction. This is shown in FIGS. 12-14. Blade structure 700 includes narrowed point 702 to provide for penetration into the volume defined by a slot 704. In this embodiment, the point 702 is positioned to enter the slot 704 axially and near a radially outward part of the slot to improve the likelihood that the insulator 350 will be managed as intented by the blade 700 (similarly to that of the embodiment of FIG. 5). Because the insulator 350 tends to curl inwardly at an open end 706 of the slot 704, entry of the point 702 at the radially outward position is advantageous, that point generally being the oint where the insulator material provides the largest opening for penetration. Once the blade 700 is positioned within the slot 704, as best seen in FIG. 13, the blade 700 is radially moved inwardly to the position illustrated in FIG. 14. It will be apparent from a brief review of the FIGS. 12-14 in sequence, that the action taking place and the resulting displacement of the insulator 350 against the walls of the slot 704, ensures that wires inserted into the slot will not disturb the intended position of the insulator 350. In another embodiment, the radially inward movement of the blade occurs not only after penetration of the blade into the slot 704 but moves radially inwardly as the blade penetrates the slot 704. The radially inward movement in such embodiment begins immediately after the point of the blade enters the slot axially. In this embodiment, axial penetration of the blade occurs simultaneously as the radial movement occurs.

From the position illustrated in FIG. 14 the blade 700 will be contacted by wires being inserted into the slot 704 and will either be pushed toward the radially outward portion of the slot by the wires or will be actuated to that position by an actuator (not shown). The result is similar to that of FIG. 5 wherein the wires are installed as desired and the insulator is in its appropriate place.

Once the first wire is inserted into the slot 704 the blade may be removed from the volume defined within slot 704. This may be accomplished by rapidly withdrawing the blade; slowing the progress of the wires being inserted into the slot 704 to unload the blade (in sideload) thereby reducing the friction between the wires and the blade to facilitate removal; moving the blade radially outwardly at a rate of speed greater than the rate of speed of the wires being inserted into the slot 704, again to reduce side load on the blade; and stopping the insertion of the wires momentarily to remove the blade (also facilitating blade removal by reducing side load). The reduction of sideload on the blade reduces the force necessary to remove the blade in addition to reducing affect of the axially moving blade on the wire in contact therewith. This includes potential axial displacement of the wire, reduction in thickness of or removal of any insulation on the wire, etc.

Ideally, the blade will be removed prior to becoming loaded against the radially outwardmost portion of the slot, that loading being created by the inserted wires. This is to avoid mainly two disadvantages. The first is to avoid having the blade damage the insulation 350, which can occur if it is drawn thereagainst in a loaded condition and the second is to avoid the blade becoming pinched between the inserted wires and the slot, which would otherwise render blade removal work required greater than it should be.

It should be noted that while the discussion of FIGS. 12-14 occur in the singular, there may be a plurality of blades and related components as well without departing from the scope of the invention.

In accordance with the provisions of the patent statutes, the present invention has been described in what is considered to represent its preferred embodiment. However, it should be noted that the invention can be practiced otherwise than as specifically illustrated and described.

The invention claimed is:

1. A method of forming a stator core comprising:
providing a generally cylindrically-shaped stator core having a plurality of circumferentially spaced and axially-extending core slots in a surface thereof, the core slots extending between a first and a second end of the stator core;
providing a stator winding having a plurality of phases, each phase comprised of at least one conductor having a plurality of slot segments housed in the core slots, the slot segments alternately connected at the first and second ends of the stator core by the plurality of end loop segments;
providing a plurality of insulators;
placing one insulator within each of the core slots;
securing the insulators within the core slots by inserting tooling into the core slots such that the insulator is disposed between the tooling and at least one side of the core slots thereby pressing the insulator to the at least one side of the core slot; and
inserting the slot segments into said core slots radially inboard of the tooling.

2. The method according to claim 1 wherein a width of the tooling closely fits to the width of the slots including the insulators.

3. The method according to claim 1 wherein the tooling extends outward radially as the slot segments are inserted into the core slots.

4. The method according to claim 3 wherein the tooling extends outward radially due to the force applied by the slot segments.

5. The method according to claim 1 wherein said conductors of said winding are formed in a cascaded winding.

6. The method according to claim 1 wherein at least one of said slot segments has a circumferential width less than two millimeters.

7. The method according to claim 1 wherein at least one of said end loop segments has a pitch greater than three.

* * * * *